US012027791B2

(12) United States Patent
Lin et al.

(10) Patent No.: US 12,027,791 B2
(45) Date of Patent: Jul. 2, 2024

(54) BOARD TO BOARD CONNECTORS

(71) Applicant: Hewlett-Packard Development Company, L.P., Spring, TX (US)

(72) Inventors: Hung-Ming Lin, Taipei (TW); Chin-Chang Ho, Taipei (TW); Jui-Hsuan Chang, Taipei (TW); Shaheen Saroor, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 17/419,806

(22) PCT Filed: Jul. 31, 2019

(86) PCT No.: PCT/US2019/044481

§ 371 (c)(1),
(2) Date: Jun. 30, 2021

(87) PCT Pub. No.: WO2021/021190

PCT Pub. Date: Feb. 4, 2021

(65) Prior Publication Data

US 2022/0149552 A1 May 12, 2022

(51) Int. Cl.

| | |
|---|---|
| ***H01R 12/00*** | (2006.01) |
| ***H01R 12/72*** | (2011.01) |
| ***H01R 12/73*** | (2011.01) |

(52) U.S. Cl.

CPC ........... *H01R 12/728* (2013.01); *H01R 12/73* (2013.01)

(58) Field of Classification Search

CPC ...... H01R 12/728; H01R 12/73; H01R 27/00; H01R 12/716; H01R 13/514

See application file for complete search history.

(56) References Cited

U.S. PATENT DOCUMENTS

| | | | | |
|---|---|---|---|---|
| 5,558,540 A * | 9/1996 | Kato | H01R 12/716 439/940 |
| 5,697,799 A * | 12/1997 | Consoli | H01R 12/716 439/910 |
| 5,758,100 A | 5/1998 | Odisho | |

(Continued)

FOREIGN PATENT DOCUMENTS

| | | |
|---|---|---|
| EP | 0561642 A1 | 9/1993 |
| EP | 2369692 A1 | 9/2011 |
| WO | WO-2006010657 A1 | 2/2006 |

*Primary Examiner* — Abdullah A Riyami
*Assistant Examiner* — Nelson R. Burgos-Guntin
(74) *Attorney, Agent, or Firm* — Quarles & Brady LLP

(57) ABSTRACT

A board to board connector includes a first male connector and a second male connector. The first male connector includes a first number of pins. The second male connector is aligned with the first male connector and includes a second number of pins. The first male connector is configured to be removably electrically coupled to a first female connector including a third number of pins equal to the first number and the second male connector is configured to be removably electrically coupled to a second female connector including a fourth number of pins equal to the second number. The first male connector and the second male connector are also configured to be removably electrically coupled to a single third female connector including a fifth number of pins equal to the first number plus the second number.

19 Claims, 4 Drawing Sheets

(56) References Cited

U.S. PATENT DOCUMENTS

| | | | | |
|---|---|---|---|---|
| 5,902,136 | A | 5/1999 | Lemke et al. | |
| 5,915,975 | A * | 6/1999 | McGrath | H01R 12/716 439/74 |
| 6,461,197 | B2 | 10/2002 | Crane, Jr. et al. | |
| 6,835,100 | B1 | 12/2004 | Chen | |
| 7,044,745 | B2 | 5/2006 | Reinhardt et al. | |
| 7,074,085 | B2 * | 7/2006 | Chen | H01R 13/658 439/108 |
| 7,494,346 | B1 * | 2/2009 | Peng | H01R 12/716 439/74 |
| 7,591,669 | B1 * | 9/2009 | Peng | H01R 12/716 439/910 |
| 8,732,941 | B2 * | 5/2014 | Schuetz | H05K 3/00 29/729 |
| 9,414,131 | B2 | 8/2016 | Meng | |
| 9,634,446 | B2 | 4/2017 | Chien et al. | |
| 10,028,403 | B1 | 7/2018 | Hartman et al. | |
| 11,201,429 | B2 * | 12/2021 | Kobayashi | H01R 13/502 |
| 11,251,549 | B2 * | 2/2022 | Oosaka | H01R 13/24 |
| 2006/0164819 | A1 | 7/2006 | Romahn | |
| 2007/0101037 | A1 | 5/2007 | Lin et al. | |
| 2013/0149908 | A1 * | 6/2013 | Little | H01R 12/716 439/660 |
| 2014/0302692 | A1 * | 10/2014 | Raff | H01R 12/716 439/65 |
| 2015/0237730 | A1 | 8/2015 | Liu et al. | |
| 2016/0036148 | A1 * | 2/2016 | Koguchi | H01R 12/716 439/66 |
| 2017/0006733 | A1 * | 1/2017 | Gregori | H01R 12/00 |
| 2017/0242804 | A1 * | 8/2017 | Voor | G06F 3/023 |
| 2017/0373431 | A1 * | 12/2017 | Lee | H05K 1/14 |
| 2018/0168042 | A1 * | 6/2018 | Hartman | H05K 3/4691 |
| 2021/0096614 | A1 * | 4/2021 | Hsieh | G06F 13/409 |

* cited by examiner

BOARD TO BOARD CONNECTORS

BACKGROUND

Board to board connectors may be used to transfer electrical signals between a first board (e.g., a first printed circuit board) and a second board (e.g., a second printed circuit board) in systems. Board to board connectors may be used in a variety of systems, such as tower computers, desktop computers, small form factor computers, retail point of sale terminals, thin clients, workstations, etc.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A first board (e.g., a first printed circuit board) may need to transmit one or multiple types of electrical signals and/or power to a second board (e.g., a second printed circuit board), such as serial data signals, Video Graphic Array (VGA) signals, DisplayPort (DP) signals, High-Definition Multimedia Interface (HDMI) signals, Universal Serial Bus (USB) signals (e.g., Dual USB signals, Type C signals, Type C 100 W Power Delivery (PD) signals), Thunderbolt™ signals (e.g., TBT 3.0 signals), 2.5G Local Area Network (LAN) signals, Fiber Network Interface Card (NIC) signals, and/or other signals. Each of the above signals may use a different number of pins to transmit the signals, thus resulting in board to board connectors designed specifically for each type of signal.

Accordingly, disclosed herein are board to board connectors for transmitting electrical signals between a first board and a second board (e.g., a first printed circuit board and a second printed circuit board). The board to board connectors include a first half of the connector to be attached to the first board and a second half of the connector to be attached to the second board. The first half of the connector includes two male connectors. The second half of the connector may include a female connector to couple to either one of the two male connectors or a single female connector to couple to both of the male connectors as described in further detail below. Therefore, the board to board connectors disclosed herein provide flexibility by enabling multiple system designs having different board to board signal requirements to use the same set of connectors.

Figure 1A:
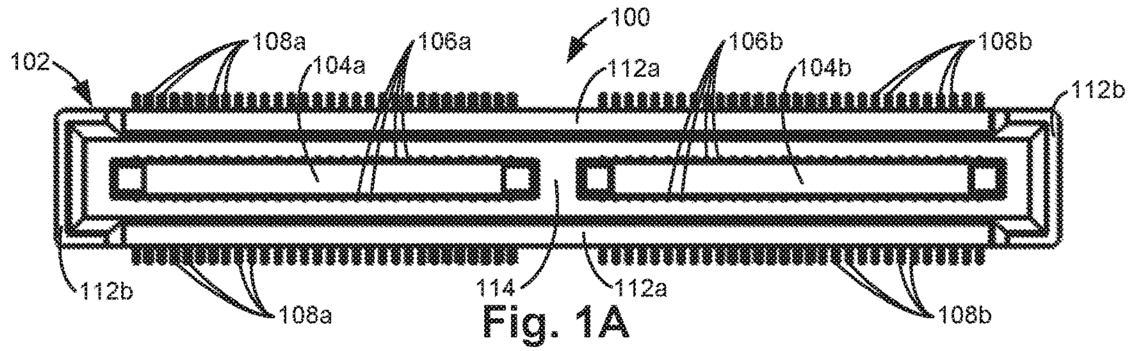
FIGS. 1A-1B are schematic diagrams illustrating one example of a first half of a board to board connector.
Figure 1B:
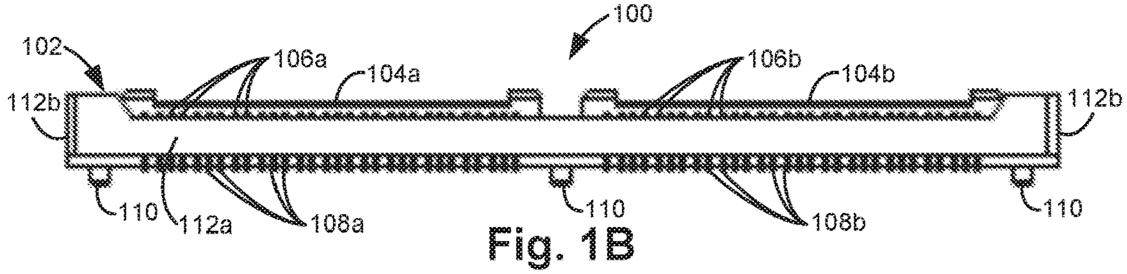

FIG. 1A is a top view and FIG. 1B is a side view illustrating one example of a first half 100 of a board to board connector. First half 100 of the board to board connector includes a housing 102, a first male connector 104*a* including a first number of pins 106*a*, and a second male connector 104*b* including a second number of pins 106*b*. The second male connector 104*b* is aligned with the first male connector 104*a*. The first male connector 104*a* is configured to be removably electrically coupled to a first female connector (to be described below with reference to FIGS. 2A-2B) including a third number of pins equal to the first number. The second male connector 104*b* is configured to be removably electrically coupled to a second female connector (to be described below with reference to FIGS. 2A-2B) including a fourth number of pins equal to the second number. The first male connector 104*a* and the second male connector 104*b* are also configured to be removably electrically coupled to a single third female connector (to be described below with reference to FIGS. 3A-3B) including a fifth number of pins equal to the first number plus the second number.

The first number may be equal to the second number. In one example, the first number equals 60 and the second number equals 60. In other examples, the first number may be different from the second number. The first male connector 104*a* may be integral to the second male connector 104*b* via, for example, housing 102. Pins 106*a* of first male connector 104*a* are electrically coupled to corresponding pins 108*a*, which are configured to be electrically coupled to a first board. Likewise, pins 106*b* of second male connector 104*b* are electrically coupled to corresponding pins 108*b*, which are configured to be electrically coupled to a first board.

Housing 102 may include posts 110 for aligning and/or attaching the first half 100 of the board to board connector to a first board. Housing 102 also includes opposing sidewalls 112*a* along the length of first portion 100 and opposing sidewalls 112*b* along the width of the first portion 100. The sidewalls 112*a* and 112*b* define a socket 114. The first male connector 104*a* and the second male connector 104*b* are arranged within the socket 114 between the sidewalls 112*a* and 112*b*. While in this example, the sidewalls 112*b* have a greater height than the sidewalls 112*a*, in other examples, the sidewalls 112*a* and 112*b* may have the same height.

Figure 2A:
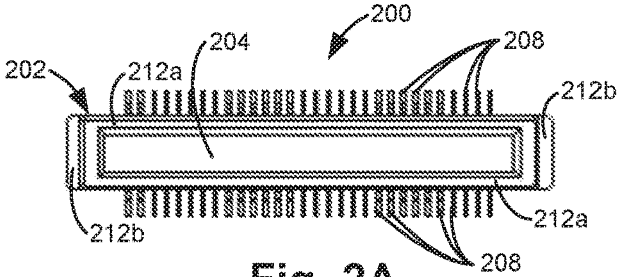
FIGS. 2A-2B are schematic diagrams illustrating one example of a second half of a board to board connector.
Figure 2B:
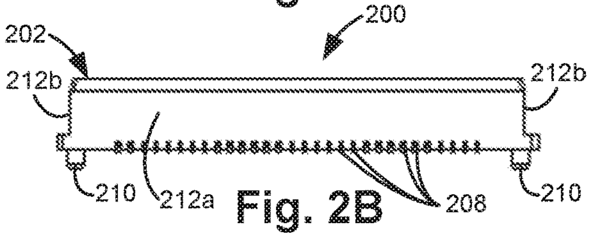

FIG. 2A is a top view and FIG. 2B is a side view illustrating one example of a second half 200 of a board to board connector. Second half 200 of the board to board connector includes a housing 202, a female connector 204 including a third number of pins 208. The female connector 204 is configured to be removably electrically coupled to a first male connector (e.g., 104*a*) or a second male connector (e.g., 104*b*). Accordingly, the third number of pins 208 may equal the first number of pins 106*a* and/or the second number of pins 106*b*. In one example, the third number equals 60.

Female connector 204 is configured such that when female connector 204 is removably electrically coupled to the first male connector 104*a* or the second male connector 104*b*, pins 208 of female connector 204 are electrically coupled to corresponding pins 106*a* or 106*b* of first male connector 104*a* or second male connector 104*b*, respectively. Pins 208 of the second portion 200 of the board to board connector are configured to be electrically coupled to a second board.

Housing 202 may include posts 210 for aligning and/or attaching the second half 200 of the board to board connector to a second board. Housing 202 also includes opposing sidewalls 212*a* along the length of second portion 200 and opposing sidewalls 212*b* along the width of the second portion 200. The sidewalls 212*a* and 212*b* define female connector 204. Housing 202 of the second half 200 of the board to board connector is configured to be at least partially removably received within socket 114 of the first half 100 of a board to board connector.

Figure 3A:
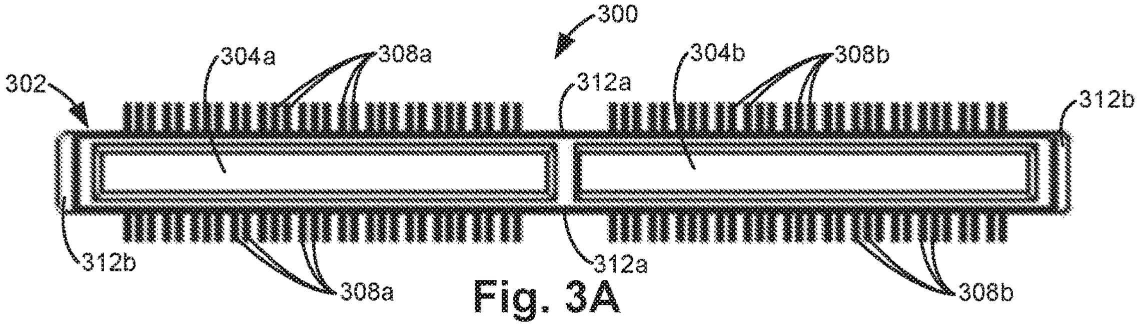
FIGS. 3A-3B are schematic diagrams illustrating another example of a second half of a board to board connector.
Figure 3B:
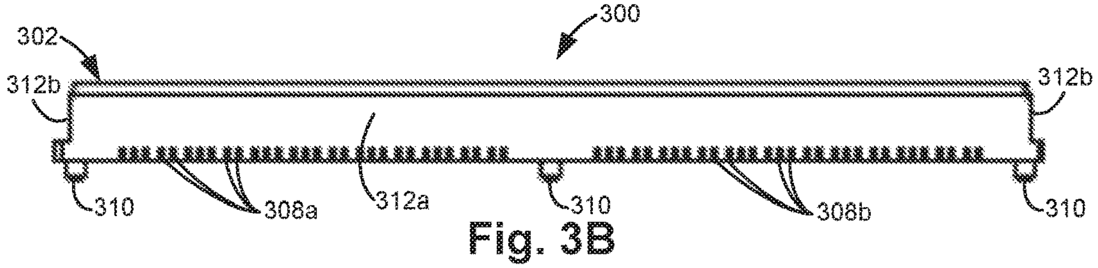

FIG. 3A is a top view and FIG. 3B is a side view illustrating another example of a second half 300 of a board to board connector. Second half 300 of the board to board connector includes a housing 302, a single female connector including a first portion 304*a* including a third number of pins 308*a* and a second portion 304*b* including a fourth number of pins 308*b* such that the single female connector includes a fifth number of pins equal to the third number plus the fourth number. The female connector 304*a*, 304*b* is configured to be removably electrically coupled to a first male connector (e.g., 104*a*) and a second male connector (e.g., 104*b*). Accordingly, the third number of pins 308*a* may equal the first number of pins 106*a* and the fourth number of pins 308*b* may equal the second number of pins 106*b* such that the fifth number of pins equals the first number plus the second number. In one example, the third number equals 60 and the fourth number equals 60 such that the fifth number equals 120.

Female connector 304*a*, 304*b* is configured such that when female connector 304*a*, 304*b* is removably electrically coupled to the first male connector 104*a* and the second male connector 104*b*, pins 308*a* of the first portion 304*a* are electrically coupled to corresponding pins 106*a* of the first male connector 104*a*, and pins 308*b* of the second portion 304*b* are electrically coupled to corresponding pins 106*b* of the second male connector 104*b*. Pins 308*a* and 308*b* of second portion 300 of the board to board connector are configured to be electrically coupled to a second board.

Housing 302 may include posts 310 for aligning and/or attaching the second half 300 of the board to board connector to a second board. Housing 302 also includes opposing sidewalls 312*a* along the length of second portion 300 and opposing sidewalls 312*b* along the width of the second portion 300. The sidewalls 312*a* and 312*b* define the female connector 304*a*, 304*b*. Housing 302 of the second half 300 of the board to board connector is configured to be at least partially removably received within socket 114 of the first half 100 of a board to board connector.

Figure 4A:
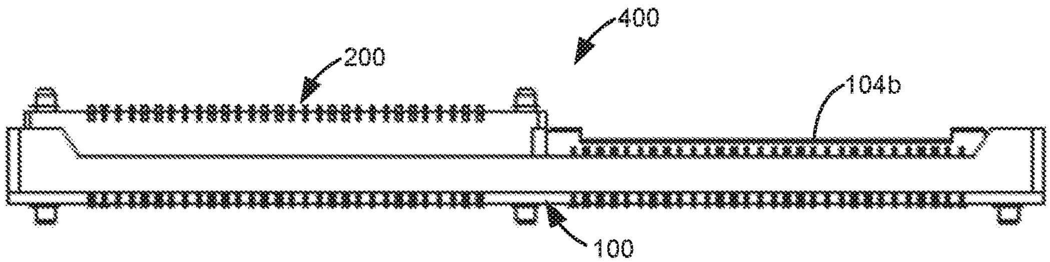
FIGS. 4A-4D are schematic diagrams illustrating example connection options for the first half and second half of a board to board connector.

FIG. 4A is a schematic diagram illustrating one example of a board to board connector 400. Board to board connector 400 includes a first half 100 and a second half 200 as previously described and illustrated with reference to FIGS. 1A-1B and FIGS. 2A-2B, respectively. In this example, the second half 200 is removably electrically and mechanically coupled to the first male connector 104*a* (not visible) of the first half 100.

Figure 4B:
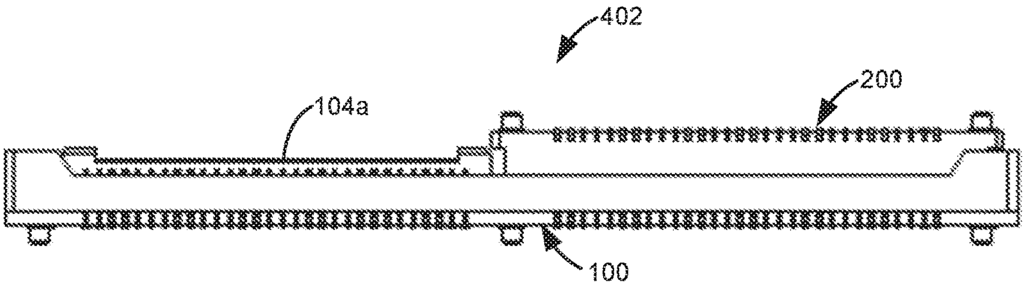

FIG. 4B is a schematic diagram illustrating one example of a board to board connector 402. Board to board connector 402 includes a first half 100 and a second half 200 as previously described and illustrated with reference to FIGS. 1A-1B and FIGS. 2A-2B, respectively. In this example, the second half 200 is removably electrically and mechanically coupled to the second male connector 104*b* (not visible) of the first half 100.

Figure 4C:
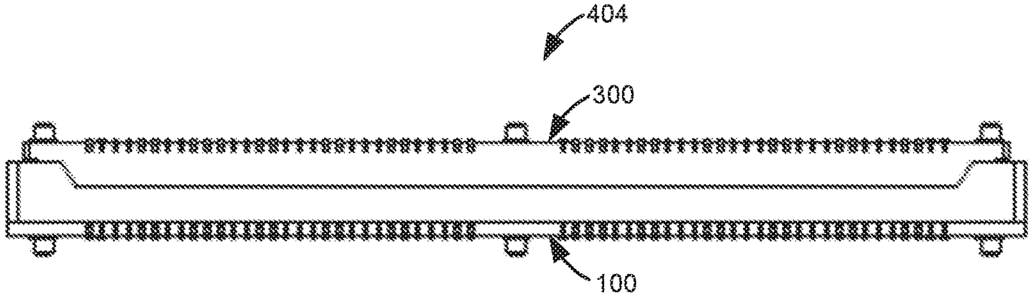

FIG. 4C is a schematic diagram illustrating one example of a board to board connector 404. Board to board connector 404 includes a first half 100 and a second half 300 as previously described and illustrated with reference to FIGS. 1A-1B and FIGS. 3A-3B, respectively. In this example, the second half 300 is removably electrically and mechanically coupled to the first male connector 104*a* and the second male connector 104*b* of the first half 100.

Figure 4D:
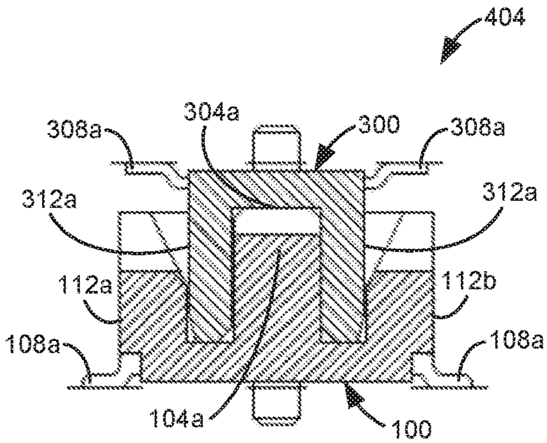

FIG. 4D illustrates a cross-sectional view of board to board connector 404 of FIG. 4C. A similar cross-sectional view is also applicable to board to board connector 400 of FIG. 4A and board to board connector 402 of FIG. 4B. As illustrated in FIG. 4D, the first male connector 104*a* engages the first portion 304*a* of the female connector such that the opposing sidewalls 312*a* of the female connector are between the opposing sidewalls 112*a* of the first half 100 of the board to board connector 404. With the first male connector 104*a* engaged with the first portion 304*a* of the female connector, pins 108*a* of first half 100 of the board to board connector 404 are electrically coupled to corresponding pins 308*a* of the second half 300 of the board to board connector 404.

Figure 5A:
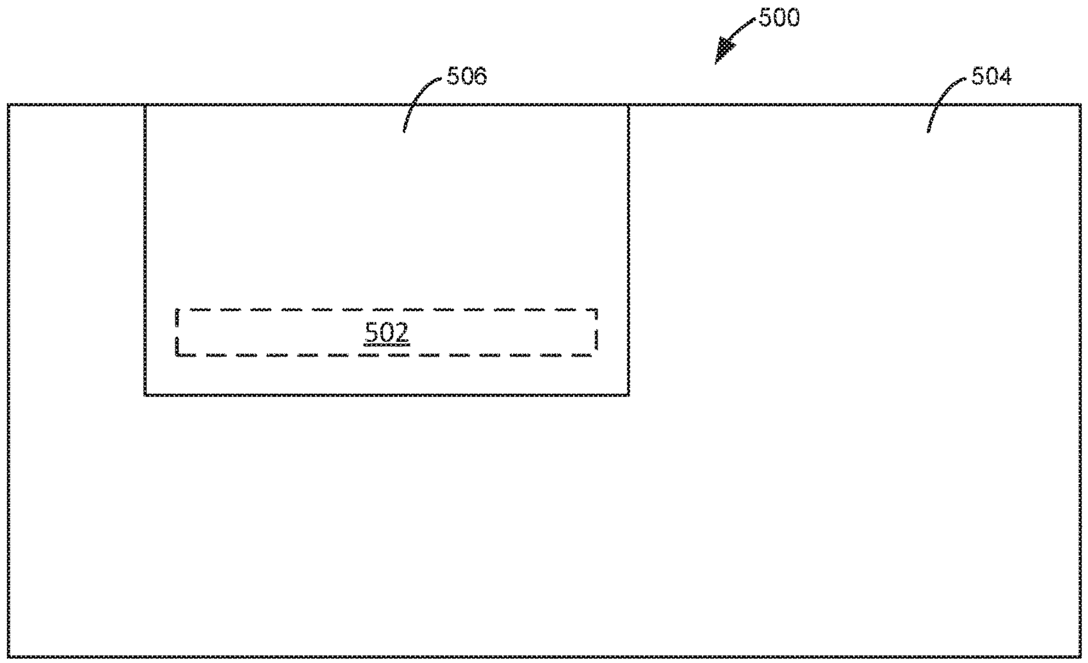
FIGS. 5A-5D are simplified schematic diagrams illustrating example systems including a board to board connector.

FIG. 5A is a simplified top view illustrating one example of a system 500 including a board to board connector 502. System 500 includes a first board 504, a second board 506, and board to board connector 502 electrically coupling the first board 504 to the second board 506. Board to board connector 502 may include board to board connector 400, 402, or 404 as previously described and illustrated with reference to FIGS. 4A-4D and as further described and illustrated with reference to the following FIGS. 5B-5D. While in this example first board 504 is larger than second board 506, in other examples, first board 504 may be the same size or larger than the second board 506.

In one example, first board 504 is a mother board, and second board 506 is an input/output board. System 500 may be part of a tower computer, a desktop computer, a small form factor computer, a retail point of sale terminal, a thin client, a workstation, or another suitable system. Board to board connector 502 may pass one or multiple electrical signals and/or power between first board 504 and second board 506, such as serial data signals, VGA signals, DP signals, HDMI signals, USB signals (e.g., Dual USB signals, Type C signals, Type C 100 W PD signals), Thunderbolt™ signals (e.g., TBT 3.0 signals), 2.5G LAN signals, Fiber NIC signals, and/or other signals.

Figure 5B:
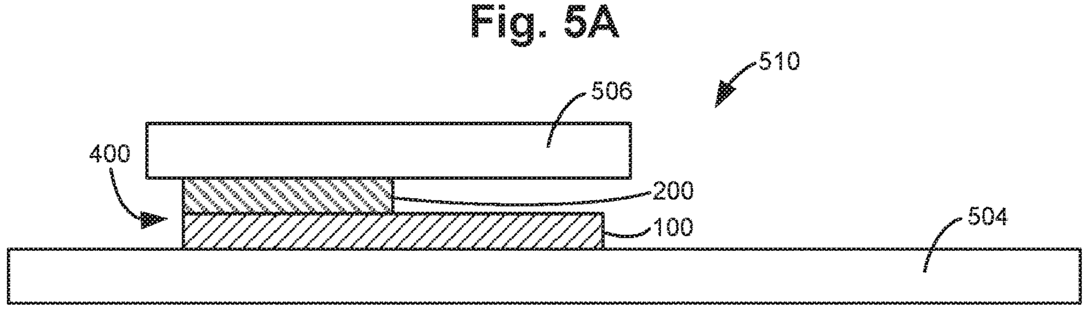

FIG. 5B is a simplified side view illustrating one example of a system 510 including a board to board connector 400 as previously described and illustrated with reference to FIG. 4A. In this example, the first board 504 includes the first half 100 of the board to board connector 400, and the second board 506 includes the second half 200 of the board to board connector 400. In other examples, the board to board connector 400 may be reversed such that the first board 504 includes the second half 200 of the board to board connector 400, and the second board 506 includes the first half 100 of the board to board connector 400. In this example, first board 504 may be a mother board, and second board 506 may be an input/output board including a serial port, a VGA port, a DP port, an HDMI port, a Type C port, a Dual USB port, and/or another suitable port that may be electrically coupled to mother board 504 through board to board connector 400. Therefore, the first board 504 may transmit one of Serial, VGA, DP, HDMI, Type C, and Dual USB signals through the first male connector 104*a* to the female connector 204.

Figure 5C:
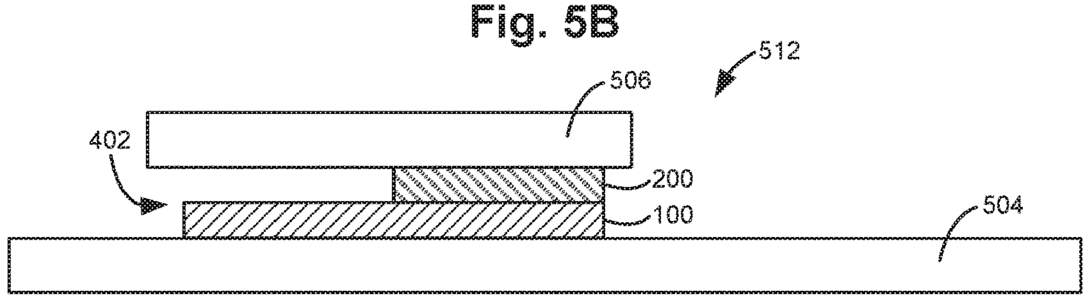

FIG. 5C is a simplified side view illustrating one example of a system 512 including a board to board connector 402 as previously described and illustrated with reference to FIG. 4B. In this example, the first board 504 includes the first half 100 of the board to board connector 402, and the second board 506 includes the second half 200 of the board to board connector 402. In other examples, the board to board connector 402 may be reversed such that the first board 504 includes the second half 200 of the board to board connector 402, and the second board 506 includes the first half 100 of the board to board connector 402. In this example, first board 504 may be a mother board and second board 506 may be an input/output board including a 2.5G LAN port, a Fiber NIC port, and/or another suitable port that may be electrically coupled to mother board 504 through board to board connector 402. Therefore, the first board 504 may transmit one of 2.5G LAN and Fiber NIC signals through the second male connector 104*b* to the female connector 204.

Figure 5D:
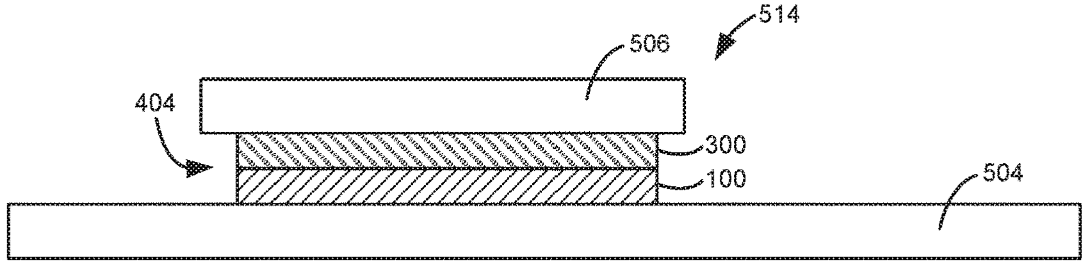

FIG. 5D is a simplified side view illustrating one example of a system 514 including a board to board connector 404 as previously described and illustrated with reference to FIG. 4C. In this example, the first board 504 includes the first half 100 of the board to board connector 404, and the second board 506 includes the second half 300 of the board to board connector 404. In other examples, the board to board connector 404 may be reversed such that the first board 504 includes the second half 300 of the board to board connector 404, and the second board 506 includes the first half 100 of the board to board connector 404. In this example, first board 504 may be a mother board and second board 506 may be an input/output board including a TBT 3.0 port, a Type C 100 W PD port, and/or another suitable port that may be electrically coupled to mother board 504 through board to board connector 404. Therefore, the first board 504 may transmit one of TBT 3.0 and Type C 100 W PD signals through the first and second male connectors 104*a* and 104*b* to the female connector 304*a*, 304*b*.

Figure 6:
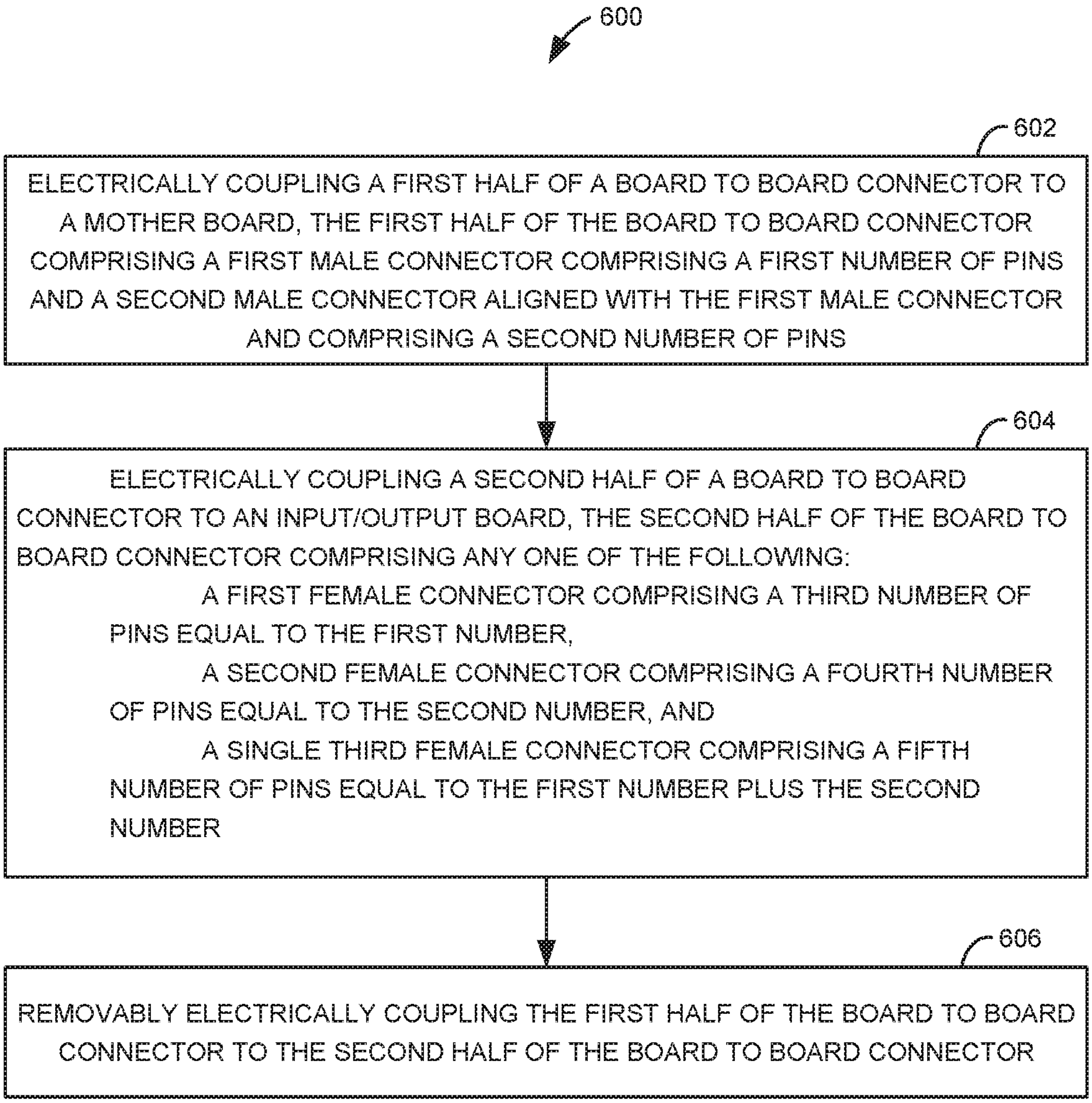
FIG. 6 is a flow diagram illustrating one example of a method for fabricating a system.

FIG. 6 is a flow diagram illustrating one example of a method 600 for fabricating a system, such as system 500, 510, 512, or 514 previously described and illustrated with reference to FIGS. 5A-5D. At 602, method 600 includes electrically coupling a first half of a board to board connector to a mother board, the first half of the board to board connector comprising a first male connector comprising a first number of pins and a second male connector aligned with the first male connector and comprising a second number of pins. At 604, method 600 includes electrically coupling a second half of a board to board connector to an input/output board, the second half of the board to board connector comprising any one of the following: a first female connector comprising a third number of pins equal to the first number, a second female connector comprising a fourth number of pins equal to the second number, and a single third female connector comprising a fifth number of pins equal to the first number plus the second number. At 606, method 600 includes removably electrically coupling the first half of the board to board connector to the second half of the board to board connector.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A board to board connector comprising:

a first male connector comprising a first number of pins, the first male connector arranged within a socket; and a second male connector comprising a second number of pins, the second male connector arranged within the socket and separated from the first male connector by an unobstructed gap, the second male connector adjacent to and longitudinally aligned with the first male connector;

wherein the first male connector is configured to be removably electrically coupled to a first female connector comprising a third number of pins equal to the first number and the second male connector is configured to be removably electrically coupled to a second female connector comprising a fourth number of pins equal to the second number, and wherein the first male connector and the second male connector are configured to be removably electrically coupled to a single third female connector comprising a fifth number of pins equal to the first number plus the second number.

2. The board to board connector of claim 1, wherein the first number is equal to the second number.

3. The board to board connector of claim 1, wherein the first number equals 60 and the second number equals 60.

4. The board to board connector of claim 1, wherein the first male connector is integral to the second male connector.

5. A system comprising:

a first board comprising a first half of a board to board connector, the first half of the board to board connector comprising a first male connector comprising a first number of pins and a second male connector adjacent to and longitudinally aligned with the first male connector and comprising a second number of pins, the first male connector and the second male connector arranged within a socket and separated by an unobstructed gap;

a second board comprising a second half of a board to board connector, the second half of the board to board connector comprising any one of the following:

a first female connector comprising a third number of pins equal to the first number and removably electrically coupled to the first male connector, a second female connector comprising a fourth number of pins equal to the second number and removably electrically coupled to the second male connector, and a single third female connector comprising a fifth number of pins equal to the first number plus the second number and removably electrically coupled to the first and second male connectors.

6. The system of claim 5, wherein the first number is equal to the second number.

7. The system of claim 5, wherein the first number equals 60 and the second number equals 60.

8. The system of claim 5, wherein the first male connector is integral to the second male connector.

9. The system of claim 5, wherein the first board is to transmit one of Serial, VGA, DP, HDMI, Type C, and Dual USB signals through the first male connector to the first female connector.

10. The system of claim 5, wherein the first board is to transmit one of 2.5G LAN and Fiber NIC signals through the second male connector to the second female connector.

11. The system of claim 5, wherein the first board is to transmit one of TBT 3.0 and Type C 100 W PD signals through the first and second male connectors to the third female connector.

12. A method for fabricating a system, the method comprising:

electrically coupling a first half of a board to board connector to a mother board, the first half of the board to board connector comprising a first male connector comprising a first number of pins and a second male connector adjacent to and longitudinally aligned with the first male connector and comprising a second number of pins, the first male connector and the second male connector arranged within a socket and separated by an unobstructed gap;

electrically coupling a second half of a board to board connector to an input/output board, the second half of the board to board connector comprising any one of the following:

a first female connector comprising a third number of pins equal to the first number, a second female connector comprising a fourth number of pins equal to the second number, and a single third female connector comprising a fifth number of pins equal to the first number plus the second number; and removably electrically coupling the first half of the board to board connector to the second half of the board to board connector.

13. The method of claim 12, wherein the first number is equal to the second number.

14. The method of claim 12, wherein the first number equals 60 and the second number equals 60.

15. The method of claim 12, wherein the first male connector is integral to the second male connector.

16. The board to board connector of claim 1, further comprising:

a housing;

wherein the housing has a pair of first sidewalls defining a length of the housing; and wherein the housing has a pair of second sidewalls defining a width of the housing.

17. The board to board connector of claim 16, wherein the second sidewalls have a height that is greater than a height of the first sidewalls.

18. The board to board connector of claim 16, wherein the housing includes one or more posts extending away from the housing, and wherein the one or more posts extend away from the housing in a direction opposite the male connector or the female connector.

19. The board to board connector of claim 18, wherein the posts are arranged parallel to the male connector or the female connector.

* * * * *